United States Patent [19]

Hatter

[11] Patent Number: 4,485,510
[45] Date of Patent: Dec. 4, 1984

[54] THREADED FASTENER HAVING MINIMIZED LENGTH AND WEIGHT AND METHOD TO MAKE IT

[75] Inventor: Edwin E. Hatter, Torrance, Calif.

[73] Assignee: Hi-Shear Corporation, Torrance, Calif.

[21] Appl. No.: 338,249

[22] Filed: Jan. 11, 1982

[51] Int. Cl.³ .............................................. B21N 3/08
[52] U.S. Cl. ........................................ 10/10 R; 10/2; 72/92; 72/103
[58] Field of Search ..................... 10/2, 10; 72/92, 93, 72/103, 104

[56] References Cited

U.S. PATENT DOCUMENTS 2,213,040 4/1940 Drissner ............................. 10/10 R
2,303,224 11/1942 Olson ................................ 10/10 R

FOREIGN PATENT DOCUMENTS 559838 3/1944 United Kingdom .

Primary Examiner—W. D. Bray
Attorney, Agent, or Firm—Donald D. Mon

[57] ABSTRACT

A threaded fastener has a pin with a head, a cylindrical shank, a shoulder with reducing diameter, a radius at the least diameter of the shoulder whose region is work-hardened, and a threaded end, in that order. The thread extends into near-adjacency to the shoulder, and has no more than approximately one-half of a convolution of an incomplete thread at its end adjacent to the shoulder. A collar is threadable onto the thread. It has a counterbore no longer than the anticipated grip range plus approximately one-half of a thread pitch. The collar may be inherently torque-limited. The term "thread" also includes a peripheral groove.

6 Claims, 13 Drawing Figures

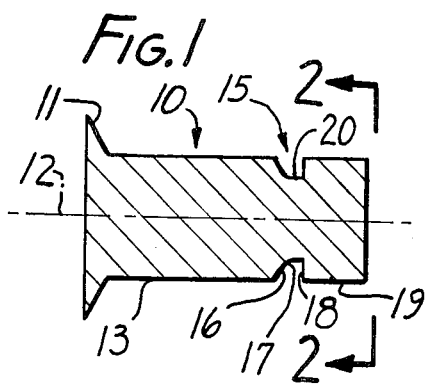
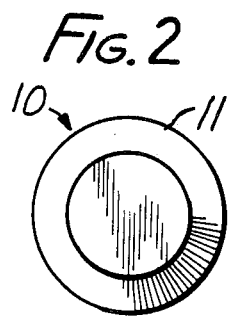
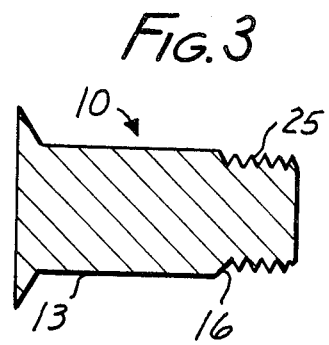
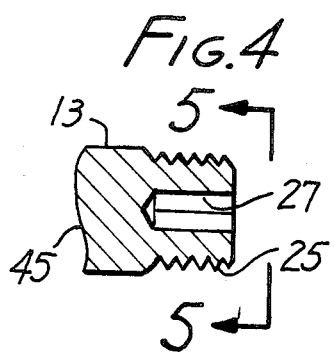
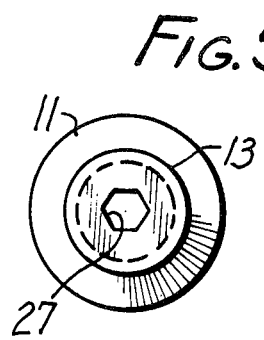
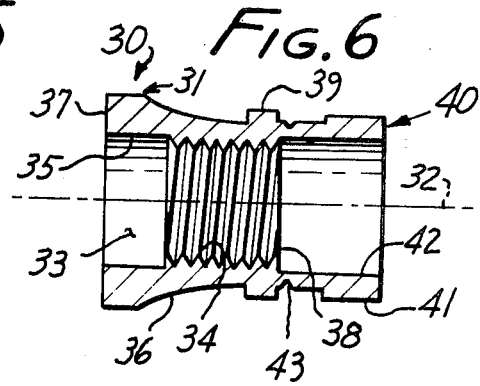
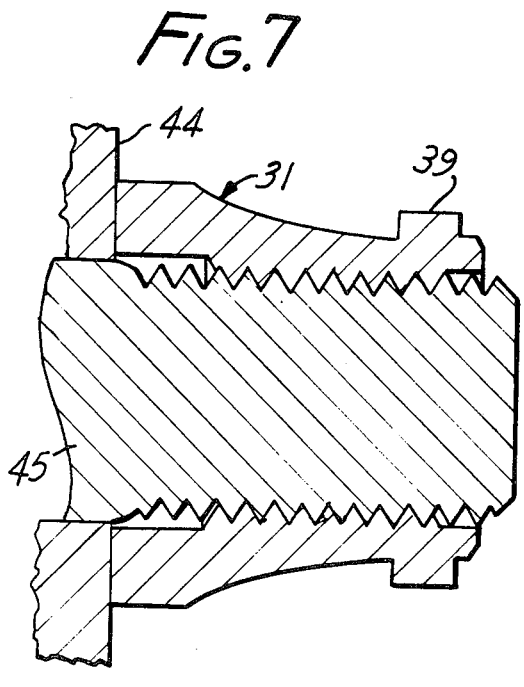
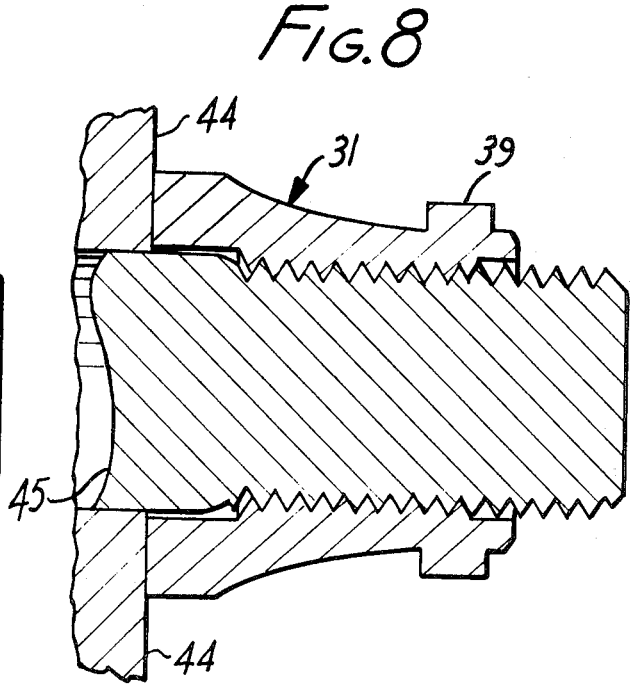

4,485,510

THREADED FASTENER HAVING MINIMIZED LENGTH AND WEIGHT AND METHOD TO MAKE IT

FIELD OF THE INVENTION

This invention relates to a threaded fastener, and in particular to a fastener whose length and weight are minimized.

BACKGROUND OF THE INVENTION

Threaded fasteners, including inherently torque-limited fasteners, are well-known in the art. High performance fasteners are quite expensive, and often are used in installations where excessive weight is objectionable not only because of the cost of the material, but because of added operational costs which may be proportional to weight. For example, each additional pound added to the weight of an aircraft adds considerably to its annual cost of operation.

Reduction in weight has been attained by the use of light-weight materials such as titanium, but weight savings from substitution of material are becoming increasingly difficult to make.

It is an object of this invention to reduce the weight of a fastener by providing a structure whose thread length can be reduced, and thereby the length and weight of the pin can be reduced. Also, because collars for such installations usually have counterbores to contain the incomplete threads that are conventionally formed on the pin, the collars must be long enough for the counterbore and for the necessary length of its own thread. This requires the collar to be longer and weigh more. Having fewer incomplete threads requires a shorter counterbore, and therefore a shorter and lighter collar can be used.

High performance, inherently torque-limited fasteners and joints of the type disclosed herein are generically shown in George S. Wing U.S. Pat. No. 3,390,906, issued July 2, 1968. In addition, localized work hardening of pins is known, an example being shown in the U.S. patent application Ser. No. 108,959, filed Dec. 31, 1979, now U.S. Pat. No. 4,326,825, issued Apr. 27, 1982, by Josef F. Volkmann, Edwin E. Hatter and Michael M. Schuster, entitled "Balanced Pin For Shear Flow Joint, and Joint Including the Pin", which is owned by the same assignee as this instant patent application.

It is an object of this invention to provide an improved lighter-weight fastener, which optionally may include inherent torque-limiting features.

BRIEF DESCRIPTION OF THE INVENTION

A fastener according to this invention includes a shear pin having a head, a cylindrical shank, a shoulder contiguous to the shank reducing in diameter, a radius at the least diameter of the shoulder whose region is work hardened, and a threaded end, in the order recited from the head. The thread extends in near-adjacency to the shoulder, and has no more than approximately one-half of a convolution of incomplete thread at its end nearest to the shoulder.

A collar is threadable to the thread, and includes a counterbore to clear the incomplete thread. The length of the counterbore is no greater than the anticipated grip range of the fastener plus approximately one-half of the pitch dimension of the thread. Thus, the collar and the pin together form a very compact assembly of least length, which has adequate strength and adaptability.

According to a preferred but optional feature of the invention, the collar can include an inherent torque-limiting feature, an example of which is shown in the above identified Wing patent.

Also, or instead, the collar can, if desired, have thread locking means tending to keep the collar on the pin at a set torque, and wrench-engaging means to apply torque to the collar.

The invention also comprehends a useful method to make the pin.

The above and other features of this invention will be fully understood from the following detailed description and the accompanying drawings, in which:

BRIEF DESCRIPTION OF THE DRAWINGS

FIG. 1 is an axial cross-section of a blank from which a pin according to this invention is made, already partly processed;

FIG. 2 is a right hand end taken at line 2—2 in FIG. 1;

FIG. 3 is an axial cross-section of the blank further processed;

FIG. 4 is a fragmentary cross-section showing an optional processing of the pin;

FIG. 5 is a right hand end taken at line 5—5 in FIG. 4;

FIG. 6 is an axial cross-section of a preferred collar for use with the pin;

FIGS. 7 and 8 are assembly views showing a portion of a joint manufactured using the aforesaid pin and collar in the maximum grip and minimum grip configurations, respectively;

DETAILED DESCRIPTION OF THE INVENTION

Figure 9:
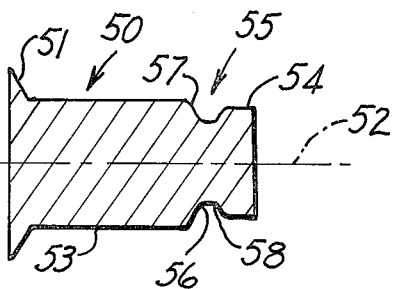
FIG. 9 is an axial cross-section showing a blank similar to that of FIG. 1, which is differently processed.

FIG. 1 shows a partially processed blank 10 for manufacturing a pin 45 according to the invention. The blank has a preformed head 11, a central axis 12, and a cylindrical shank 13.

A groove 15 has been formed by a cutting operation so as to form a shoulder 16 which reduces in diameter. Although shoulder 16 is shown with a slope, it might instead be a flat planar shoulder lying in a plane normal to the central axis. At the least diameter of the shoulder there is a radius 17. Another shoulder 18 is formed at the other side of the groove formed by the cutting process. An end section 19 is provided to receive a cut or rolled thread, preferably a rolled thread. The bottom 20 of the groove may be flat or it may be curved. The length of the bottom may be anywhere from zero to a larger value but it will generally have a minimal length for reasons which will become evident.

By means of a rolling procedure (not shown), a region which includes radius 17 (which region need not extend beyond the radius, although it could) is rolled so as to become work hardened. The blank is made of a work hardenable material so that a region including the radius and as much area adjacent thereto as desired can be work hardened to provide additional fatigue resistance and strength at this location.

Following the work hardening operation, a thread 25 is formed on the exterior of section 19. Because a thread rolling die can be applied to the end section and can extend into the groove, only a minimal portion of incomplete thread will be formed, because the lead-in portions of the die will overlay the groove. This feature determines the length of the bottom. It should be only axially long enough to enable the minimum incomplete thread to be formed as specified. According to this invention not more than approximately one-half of a convolution of the thread should be incomplete. The remainder should be complete threads. By appropriately sloping the shoulders of the groove, this function could conceivably be attained without a substantial bottom in the groove, but in an optimum fastener, the resulting reduction of length of cylindrical shank may not be desired. Thus, in the preferred embodiment there usually will be at least some bottom in the groove.

FIG. 4 shows an optional wrench engaging recess 27 which can be formed in the end section. It may conveniently be hexagonally shaped to receive a key-type wrench, but this wrench engaging recess (or none) may be provided instead, with differently shaped non-circular sections. Also they could be external (such as on a stem). If the head of the pin is adapted to be held by a wrench, then this wrench-engaging recess will not be necessary. The recess does enable the fastener to be set entirely from one end.

Accordingly, a pin described thus far includes a preformed head which is shown as a countersink head but instead could be a round protruding head, a protruding hexagonal head, or any other desired shape, a cylindrical shank, a groove which reduces in diameter, and a hardened radius at the region of least shoulder diameter, and a thread in that order from the head. The thread has no more than approximately one-half convolution of incomplete thread.

The pin is intended to be used with an internally threaded collar. The internal thread will, of course, have enough convolutions to make a proper joinder. However, this joinder should be made by complete thread convolutions, and not be incomplete ones. For this reason, such a collar is generally provided with a counterbore whose axial length is sufficient that it will clear the incomplete convolutions, and preclude engagement with the incomplete convolutions. Because a practical fastener system is designed so that each size can be used over a substantial grip range, the length of the counterbore works out to be the grip range plus the pitch length of the incomplete convolutions. Thus, incomplete convolutions inherently add to the length of the counterbore, and therefore to the length and weight of the pin, of the collar, and of their combination.

FIG. 6 shows an example of a collar 30 of the wellknown "Hi-Lok" type shown in the aforesaid Wing patent and also in U.S. Pat. No. 2,940,495, issued June 14, 1960. The illustrated embodiment of collar, made in accordance with this invention, includes a body 31 having a central axis 32, and an axial passage 33. The body has an internal thread 34 and a counterbore 35 whose axial length is not greater than the anticipated grip range plus one-half pitch length of the thread. The outer wall 36 of the body is tapered so as to reduce weight and extends from a bearing end 37 to a driving end 38. Adjacent to the driving end there is an enlarged band 39 to give structural rigidity. This band is optional. It can be pressed slightly out of round so that when the pin is threaded into it, it will be rounded out and the springback force will constitute a thread lock means.

A driving section 40 has a hexagonal driver-engaging array 41, a tubular, unthreaded transition section 42, and a groove 43 which provides a region of lesser cross section area and is the part of the collar with least resistance to torque forces. It has an inherent resistance to torque up to a given torque. At and above that given torque, the driving section will fracture at the groove and will fall loose, leaving the nut set at the intended inherent torque.

The out-of-round thread lock feature can be provided without using a band, such as by making the wall thickness of the nut near its free end sufficiently thick to be initially pressed out of round, and to maintain a sufficient pressure against the pin when forced back into round by being threaded onto the pin. Also, if the torque-limiting feature is not desired, the removable driving section can be eliminated, and the collar provided with wrench engaging means on its body. A hexagonal array of wrenching surfaces, or a group of wrench-engaging fingers, are two examples of suitable wrench engaging means.

FIG. 7 shows a set collar with a driving section torqued off and body 31 bearing against a workpiece 44 with the pin 45 at its maximum grip. FIG. 8 shows the same pin 45 at its minimum grip. Notice that the thread in the collar has very nearly reached the shoulder of the pin in FIG. 8. Of course the head bears against the workpiece on the other side, but this is not shown for purposes of simplifying the drawings, pin 45 having a head and a cylindrical shank, all as described above.

In addition to the methods and constructions already shown, there are other methods and constructions. For example, the presently preferred method for making the presently preferred construction of pin is shown in FIG. 9. A blank 50 has a head 51, a central axis 52, and a cylindrical shank 53. An end section 54 of somewhat reduced diameter is on the other side of a groove 55. Groove 55 has been formed by rolling, so as to work harden the region at a radius 56 located at the least diameter of shoulder 57. In so doing, it will also have work hardened the shoulder and the bottom 58 of the groove. The reduced diameter of the end section may have been formed by extrusion, by grinding, or by turning.

Figure 10:
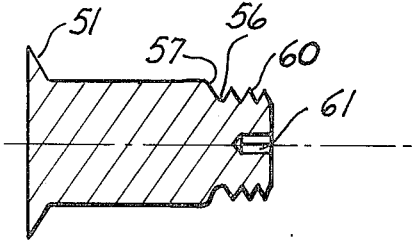
FIG. 10 is an axial cross-section showing the blank of FIG. 9 with a thread rolled on it.

Next, as shown in FIG. 10, a thread 60 is rolled on the end section, and extends to the shoulder, preferably not reaching the shoulder, but very nearly. There will be less than approximately one-half of an incomplete thread, which is caused by the lead-in portion of the rolling die. This is an optimum thread on an optionally work-hardened pin.

A wrench engaging recess 61 can be formed in the unheaded end of the pin.

Figure 11:
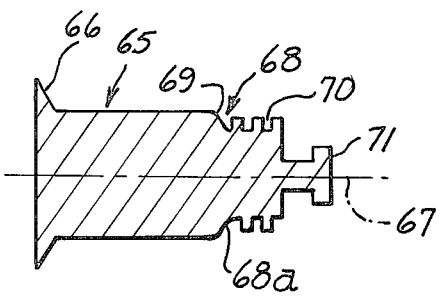
FIG. 11 is an axial cross-section showing the blank of FIG. 1 or 9 provided with a peripheral groove.

FIG. 11 illustrates that the work hardening advantage at the shoulder can be utilized with collar-engaging means other than helical threads, for example in swage-type fasteners where peripheral grooves receive swaged-in portions of collars. The wellknown "Huck" type fastener exemplifies this style. A pin 65 for such an assembly has a head 66, a central axis 67, a groove 68 preferably formed by rolling as in FIG. 9, a work hardened region at a radius 68a located at the least diameter of shoulder 69, and an end section with a plurality of peripheral grooves 70 which may be formed by cutting or by rolling. It is customary to provide a stem 71 for pulling on the pin on opposition to a swaging push on a collar to be engaged to such a pin.

Figure 12:
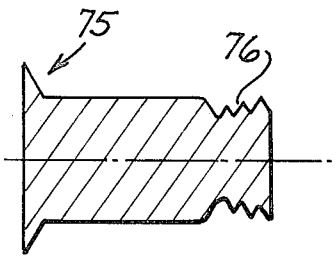
FIGS. 12 and 13 are axial cross-sections showing the blank of FIG. 1 or 9 with threads of increasing or decreasing crest diameters.

FIG. 12 shows a pin 75 which is in all respects similar to that of FIG. 10, except that its thread diameter increases as its thread 76 extends away from the headed end.

Figure 13:
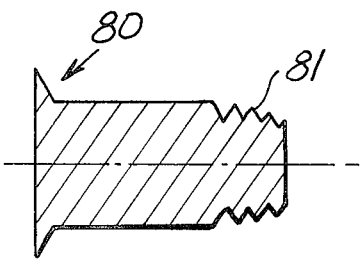

FIG. 13 shows a pin 80 which is in all respects similar to that of FIG. 10, except that its thread diameter decreases as its thread 81 extends away from the headed end.

There are applications for pin-collar combinations wherein the pin thread diameter increases or decreases as shown, and the advantages of work hardening and of having less than approximately one-half of an incomplete thread are useful in these installations, also.

The reduced end section of the blank, when utilized, can be fabricated by any suitable technique, such as by extrusion, cutting, grinding, or rolling.

The provision of the work hardened section at the radius provides fatigue resistance and strength immediately adjacent to the threads and where there is an abrupt change of shape.

A minimum amount of incomplete thread convolution is formed as a consequence of the presence of the groove. It is the least which can be formed with a conventional rolling die or cutting tool that makes its closest practical approach to the shoulder. In conventional thread rolling practice, from one to two incomplete convolutions are usually formed. This lesser length of incomplete convolutions creates a very substantial weight saving, both in the length of the pin and the length of the collar to which it is engaged, as compared to conventional fastener combinations.

It is unnecessary for purposes of this invention that the driver engaging recess be provided or that inherent torque-limited means be provided. The invention is as useful with conventional headed bolts and simple nuts as with the more sophisticated fasteners, but it is to be expected that this invention will find its greatest use in the more sophisticated systems where weight is not affordable and should be minimized. The objective of course is to provide a construction which does not require thread run out relief when forming the thread on the pin.

A suitable material for the pin is 7075T73 aluminum alloy which can be work hardened, and has excellent strength characteristics. Other suitable materials exist, and include for examples 6A1–4V titanium alloy, A286 corrosion resistant steel, and alloy steel, as well as other metallic materials capable of being work hardened.

For purposes of this invention, the peripheral grooves of FIG. 10 are referred to as a "thread". It is evident that there is no incomplete convolution in the embodiment.

This invention is not to be limited by the embodiments shown in the drawings and described in the description which are given by way of example and not of limitation, but only in accordance with the scope of the appended claims.

I claim:

1. The method of making a pin made of work hardenable metal having a cylindrical shank, a headed end and a threaded end on said shank, and minimizing the length of said threaded end by minimizing the amount of incomplete thread thereon, said method comprising: fabricating a peripheral groove in said pin next to said shank, said groove having a shoulder contiguous to said shank and a radius contiguous to said shoulder at the bottom of said groove, rolling at least said radius to work-harden the metal at that region, and fabricating a thread on the threaded end on the opposite side of said shoulder from said shank, said thread extending into near-adjacency to said shoulder and having no more than approximately one-half of a convolution of incomplete thread at its end nearest to said shoulder, said cold-rolled property being inherent in said rolled portion after fabrication of said pin is completed.

2. The method according to claim 1 in which the fabricated groove has a pair of side walls, one of which forms said shoulder, and the other of which extends away from the central axis of the shank, being modified to form part of said thread when said thread is formed.

3. The method according to claim 1 in which the groove and the thread are fabricated by rolling.

4. The method according to claim 1 in which the groove is fabricated by rolling and the thread by cutting.

5. The method according to claim 1 in which the groove is fabricated by cutting and the thread by rolling.

6. The method according to claim 1 in which both the groove and the thread are fabricated by cutting.

* * * * *